(12) United States Patent
Kemppinen

(10) Patent No.: US 10,191,147 B2
(45) Date of Patent: Jan. 29, 2019

(54) ULTRASOUND BASED CONFIGURATION DETECTION OF A MULTIPART ELECTRONIC APPARATUS

(71) Applicant: Microsoft Technology Licensing, LLC, Redmond, WA (US)

(72) Inventor: Pasi Kemppinen, Tampere (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 69 days.

(21) Appl. No.: 15/230,224

(22) Filed: Aug. 5, 2016

(65) Prior Publication Data

US 2018/0038948 A1 Feb. 8, 2018

(51) Int. Cl.
| | |
|---|---|
| *G01S 11/14* | (2006.01) |
| *G01B 17/00* | (2006.01) |
| *G06F 1/16* | (2006.01) |
| *H04M 1/02* | (2006.01) |

(52) U.S. Cl.
CPC .............. *G01S 11/14* (2013.01); *G01B 17/00* (2013.01); *G06F 1/1616* (2013.01); *G06F 1/1624* (2013.01); *G06F 1/1677* (2013.01); *H04M 1/0243* (2013.01); *G06F 2200/1637* (2013.01)

(58) Field of Classification Search
CPC ................. G01B 17/00; G01B 21/22
See application file for complete search history.

(56) References Cited

U.S. PATENT DOCUMENTS

| | | |
|---|---|---|
| 7,319,890 B2 | 1/2008 | Fan et al. |
| 8,194,001 B2 | 6/2012 | Miller et al. |
| 8,654,095 B1 | 2/2014 | Cho et al. |
| 8,803,816 B2 | 8/2014 | Kilpatrick et al. |
| 9,316,717 B2 | 4/2016 | Gicklhorn et al. |
| 2002/0060665 A1 | 5/2002 | Sekiguchi et al. |

(Continued)

FOREIGN PATENT DOCUMENTS

| | | |
|---|---|---|
| EP | 1858235 A1 | 11/2007 |
| WO | 2014021628 A1 | 2/2014 |
| WO | 2015102227 A1 | 7/2015 |

OTHER PUBLICATIONS

"Analysts think that Samsung will launch a smartphone with a foldable screen this year", Published on: Jan. 6, 2016, 12 pages, Available at: http://www.businessinsider.in/Analysts-think-that-Samsung-will-launch-a-smartphone-with-a-foldable-screen-this-year/articleshow/50469072.cms.

(Continued)

*Primary Examiner* — Hovhannes Baghdasaryan

(57) ABSTRACT

In one example, an electronic apparatus comprises a first portion having an ultrasound emitter. The electronic apparatus further comprises a second portion having an ultrasound sensor. The first portion and the second portion are arranged to be movable with respect to each other thereby allowing distance between the ultrasound emitter and the ultrasound sensor to vary. The electronic apparatus further comprises a measurement unit configured to measure current propagation delay of an ultrasound wave from the ultrasound emitter to the ultrasound sensor. The electronic apparatus further comprises a calculation unit configured to calculate current distance between the ultrasound emitter and the ultrasound sensor based on the measured current propagation delay of the ultrasound wave from the ultrasound emitter to the ultrasound sensor.

20 Claims, 4 Drawing Sheets

(56) References Cited

U.S. PATENT DOCUMENTS

| | | | |
|---|---|---|---|
| 2010/0103133 A1* | 4/2010 | Park | G06F 3/03545 |
| | | | 345/173 |
| 2010/0182265 A1 | 7/2010 | Kim et al. | |
| 2013/0093732 A1 | 4/2013 | Esteve et al. | |
| 2013/0235096 A1 | 9/2013 | Liu | |
| 2014/0035872 A1 | 2/2014 | Park et al. | |
| 2014/0160654 A1 | 6/2014 | Yoo et al. | |
| 2014/0198618 A1* | 7/2014 | Cary | G01B 17/00 |
| | | | 367/99 |
| 2014/0202014 A1 | 7/2014 | Choi et al. | |
| 2014/0210737 A1 | 7/2014 | Hwang et al. | |
| 2015/0247916 A1 | 9/2015 | Bartov et al. | |

OTHER PUBLICATIONS

Cooney, Michael, "Researchers tout foldable display for large mobile device screens", Published on: May 12, 2011, 4 pages, Available at: http://www.networkworld.com/article/2228739/smb/researchers-tout-foldable-display-for-large-mobile-device-screens.html.

"International Search Report and Written Opinion Issued in PCT Application No. PCT/US2017/044268", dated Nov. 9, 2017, 14 Pages.

* cited by examiner

ULTRASOUND BASED CONFIGURATION DETECTION OF A MULTIPART ELECTRONIC APPARATUS

BACKGROUND

Multipart electronic apparatuses, such as smartphones, laptop computers, laptop/tablet hybrids and the like, may have multiple positional configurations in which the different parts are configured in different positions with respect to each other. In some instances, the different parts may be connected to each other via connection means that do not allow detection of the current configuration via detection means (e.g. potentiometers or the like) arranged in the connection means themselves.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one example, an electronic apparatus comprises a first portion having an ultrasound emitter. The electronic apparatus further comprises a second portion having an ultrasound sensor. The first portion and the second portion are arranged to be movable with respect to each other thereby allowing distance between the ultrasound emitter and the ultrasound sensor to vary. The electronic apparatus further comprises a measurement unit configured to measure current propagation delay of an ultrasound wave from the ultrasound emitter to the ultrasound sensor. The electronic apparatus further comprises a calculation unit configured to calculate current distance between the ultrasound emitter and the ultrasound sensor based on the measured current propagation delay of the ultrasound wave from the ultrasound emitter to the ultrasound sensor.

In another example, a method and a foldable electronic apparatus have been discussed along with the features of the electronic apparatus.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of operations for constructing and operating the example. However, the same or equivalent functions and sequences may be accomplished by different examples.

At least some of the disclosed examples may allow utilizing ultrasound emitters (such as speakers) and ultrasound sensors (such as microphones) in order to detect a current positional configuration of an electronic apparatus having at least two parts or portions that are arranged to be movable with respect to each other.

Figure 1:
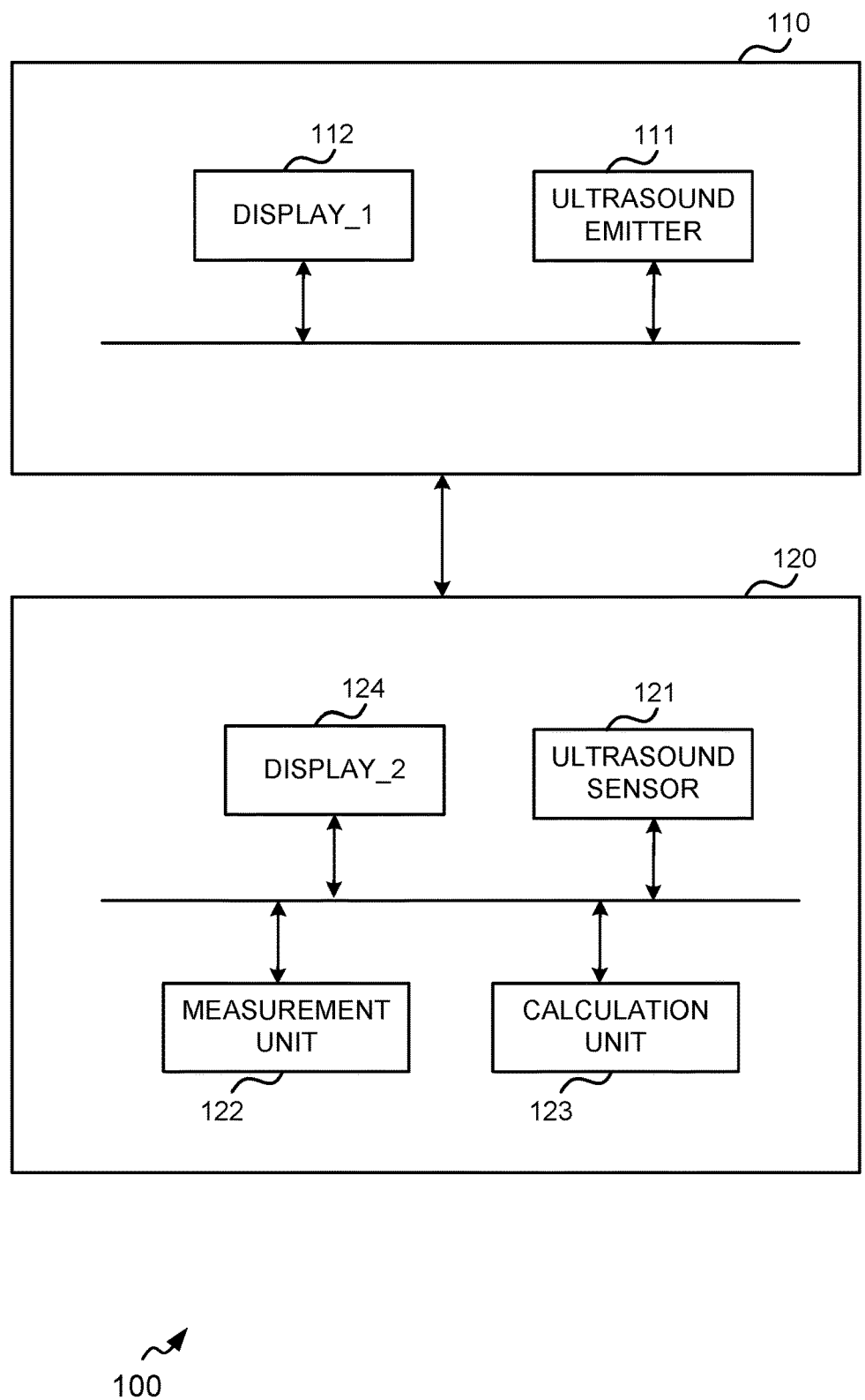
FIG. 1 is an example block diagram of an electronic apparatus in accordance with an example embodiment.

FIG. 1 illustrates an electronic apparatus 100 in accordance with an example embodiment. The electronic apparatus 100 may be employed, for example, in the device 400 of FIG. 4. However, it should be noted that the electronic apparatus 100 may also be employed on a variety of other devices and apparatuses, and therefore, embodiments should not be limited to application on devices and apparatuses such as the device 400 of FIG. 4. Furthermore, it should be noted that at least some of the elements described below may not be mandatory and thus some may be omitted in certain embodiments. The electronic apparatus 100 may include e.g. mobile communication devices (such as smart phones), tablet computers, laptop computers, laptop/tablet hybrids, and the like.

The electronic apparatus 100 comprises a first portion 110 that has an ultrasound emitter 111. The ultrasound emitter 111 may comprise a speaker. The speaker may be a speaker used for other functions as well, such as for reproducing speech. The speaker may include e.g. a dynamic speaker, a piezoelectric speaker, an electrostatic speaker, or the like. Furthermore, the first portion 110 may have at least two ultrasound emitters, some of which may be arranged on opposite sides of the first portion 110. At least some of the multiple ultrasound emitters may be arranged to transmit different portions of ultrasound frequency band and/or different signals.

The electronic apparatus 100 further comprises a second portion 120 that has an ultrasound sensor 121. The ultrasound sensor 121 may comprise a microphone. The microphone may be a microphone used for other functions as well, such as for capturing speech. Furthermore, the second portion 120 may have at least two ultrasound sensors arranged at various positions, e.g. on opposite sides of the second portion 120. Use of multiple ultrasound sensors may provide enhanced sensing capabilities.

Ultrasounds are sound waves with frequencies higher than the upper audible limit of human hearing. This limit varies from person to person and is approximately 20 kilohertz. Ultrasound devices typically operate with frequencies from 20 kHz up to e.g. several gigahertz.

The first portion 110 and the second portion 120 are arranged to be movable with respect to each other thereby allowing distance between the ultrasound emitter 111 and the ultrasound sensor 121 to vary. For example, the first portion 110 and the second portion 120 may be arranged to be foldable with respect to each other in a folding angle. Alternatively or additionally, the first portion 110 and the second portion 120 may be arranged to be slidable with respect to each other. Alternatively or additionally, the first portion 110 and/or the second portion 120 may be arranged to be bendable. Alternatively or additionally, the first portion 110 and/or the second portion 120 may be arranged to be rollable. Alternatively or additionally, the first portion 110 and/or the second portion 120 may be arranged to be removably attached to each other, utilizing e.g. magnets or the like.

Figure 2A:
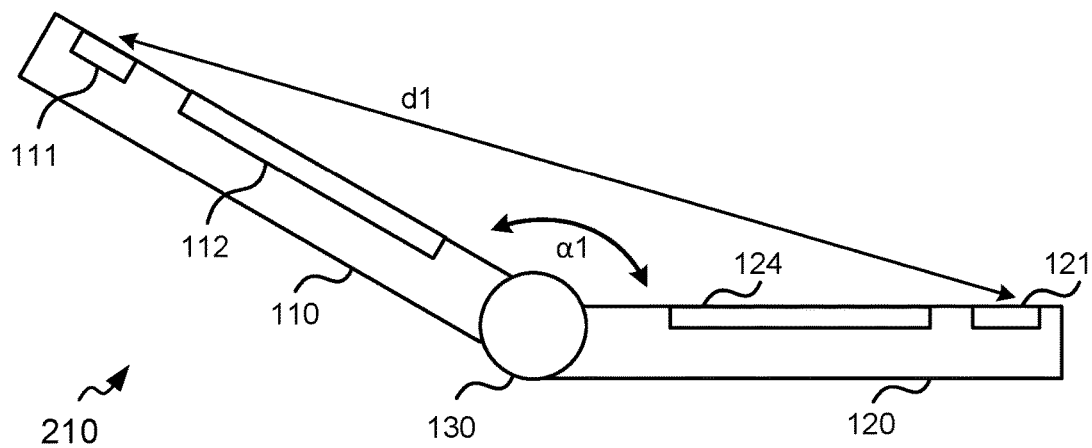
FIGS. 2A-2B are side views of an example of a foldable electronic apparatus in accordance with an example embodiment.
Figure 2B:
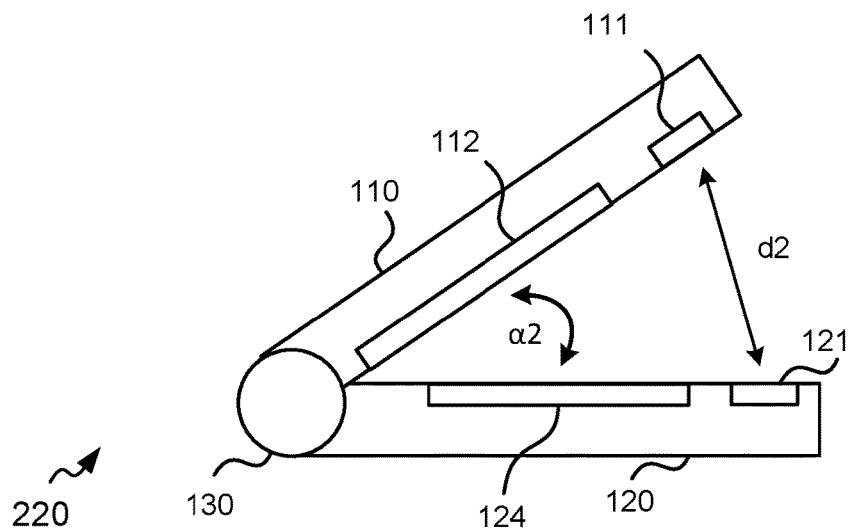

FIGS. 2A and 2B are side views of an example of a foldable electronic apparatus. FIG. 2A shows the foldable electronic apparatus in a first positional configuration 210 with a first folding angle α1 between the first portion 110 and the second portion 120, and a first distance d1 between the ultrasound emitter 111 and the ultrasound sensor 121. FIG. 2B shows the foldable electronic apparatus in a second positional configuration 210 with a second folding angle α2 between the first portion 110 and the second portion 120, and a second distance d2 between the ultrasound emitter 111 and the ultrasound sensor 121. The first portion 110 and the second portion 120 are arranged to rotate around attachment means 130, such as a hinge, a pivot, or the like. As shown in FIGS. 2A and 2B, the ultrasound emitter 111 may be arranged closer to the open end of the first portion 110 than the end with the attachment means 130. Similarly, the ultrasound sensor 121 may be arranged closer to the open end of the second portion 1210 than the end with the attachment means 130.

For example, in embodiments in which the two portions of the electronic apparatus 100 are foldable, bendable or otherwise arrangeable into an angle of over 180 degrees with respect to each other, and the first portion 110 has at least one ultrasound emitter arranged on both sides of the first portion 110 and the second portion 1210 has at least one ultrasound sensor arranged on both sides of the second portion 120, the ultrasound emitter and sensor to be used for each angle may be selected from the multiple ultrasound emitters and sensors so that the ultrasound emitter and sensor pair with the shortest line-of-sight between them is used for each angle. Furthermore, as discussed above, different ultrasound emitters may be arranged to transmit different portions of ultrasound frequency band and/or different signals.

The electronic apparatus 100 further comprises a measurement unit 122 that is configured to measure current propagation delay of an ultrasound wave from the ultrasound emitter 111 to the ultrasound sensor 121.

The electronic apparatus 100 further comprises a calculation unit 123 that is configured to calculate current distance between the ultrasound emitter 111 and the ultrasound sensor 121 based on the measured current propagation delay of the ultrasound wave from the ultrasound emitter 111 to the ultrasound sensor 121.

The speed of sound is the distance traveled per unit time by a sound wave propagating through a medium. For example, in dry air at 20° C., the speed of sound is 343.2 meters (m) per second (s). Assuming the ultrasound wave is transmitted at instant T1 from the ultrasound emitter 111 and received at instant T2 at the ultrasound sensor 121, the distance d between the ultrasound emitter 111 and the ultrasound sensor 121 may be defined e.g. as follows:

$$d=(T2-T1)\times 343.2 \text{ m/s}.$$

The calculation unit 123 may be further configured to determine current folding angle based on the calculated current distance between the ultrasound emitter 111 and the ultrasound sensor 121 and further based on configuration information about the first portion 110 and the second portion 120. Referring to FIGS. 2A and 2B, the folding angles α1 and α2 may be determined based on the calculated distances d1 and d2, respectively, as well as configuration information that includes the distance between the ultrasound emitter 111 and the attachment means 130 and the distance between the ultrasound sensor 121 and the attachment means 130, utilizing e.g. suitable trigonometric calculations.

In the example of FIG. 1, the first portion 110 comprises a first display 112 and the second portion 120 comprises a second display 124. The first display 112 and/or the second display 124 may be utilized to display a graphical user interface. The electronic apparatus 100 may be configured to update the displayed graphical user interface based on the calculated current distance between the ultrasound emitter 111 and the ultrasound sensor 121. For example, a virtual keyboard may be drawn on the graphical user interface, and the position, size and/or layout of the virtual keyboard may be varied based on the current distance between the ultrasound emitter 111 and the ultrasound sensor 121.

Alternatively or additionally, the electronic apparatus 100 may be configured to launch one or more applications based on the calculated current distance between the ultrasound emitter 111 and the ultrasound sensor 121. For example, when a foldable apparatus is detected to open, applications pre-selected by the user may be launched. Alternatively or additionally, the electronic apparatus 100 may be configured to close one or more applications based on the calculated current distance between the ultrasound emitter 111 and the ultrasound sensor 121. Alternatively or additionally, the electronic apparatus 100 may be configured to select an operating mode (such as a tablet mode for an opened positional configuration and a telephone mode for a closed positional configuration) based on the calculated current distance between the ultrasound emitter and the ultrasound sensor.

Figure 3:
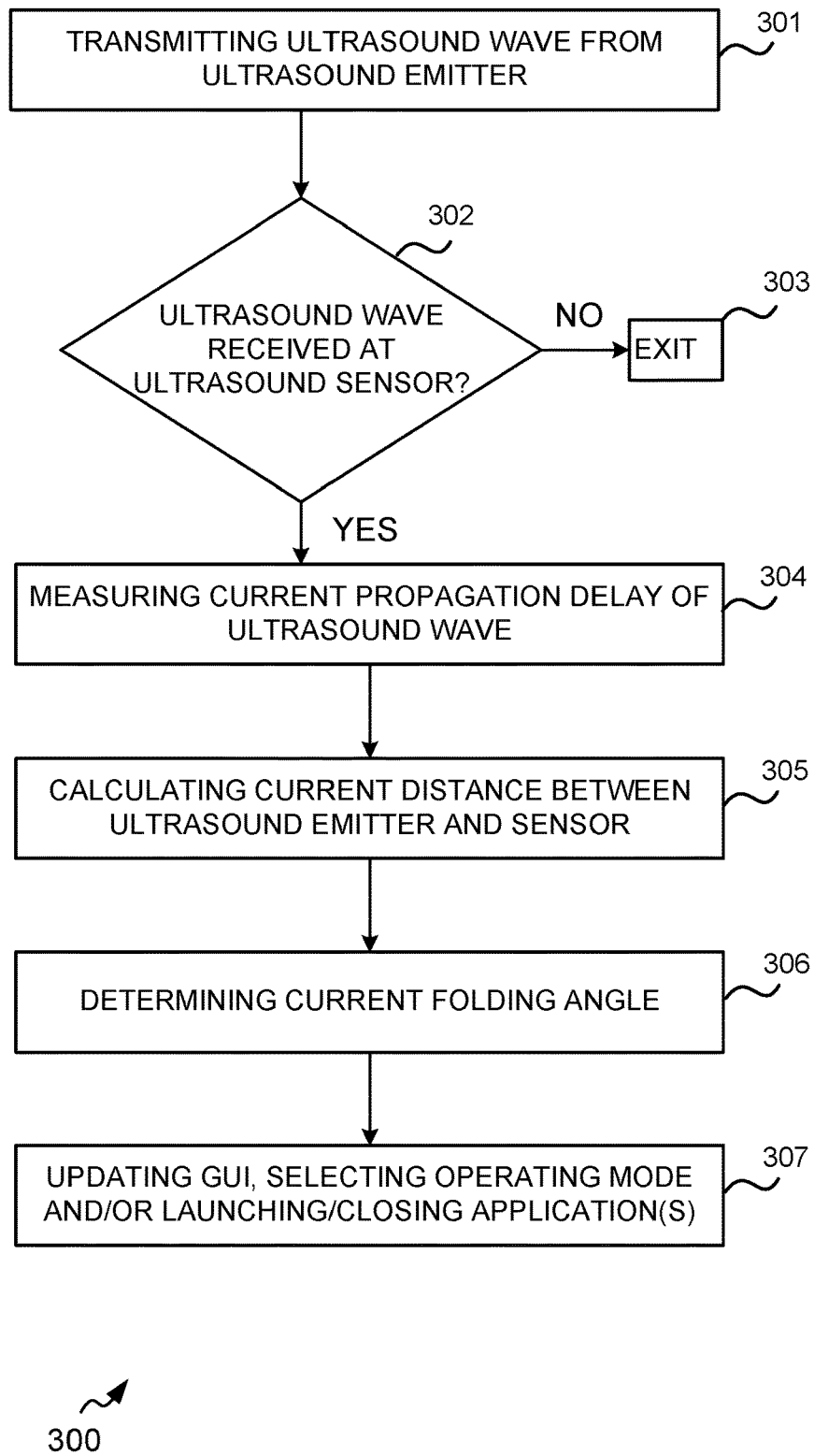
FIG. 3 is an example flow diagram of a method in accordance with example embodiments.

FIG. 3 is an example flow diagram of a method 300 in accordance with an example embodiment. At operation 301, an ultrasound wave is transmitted with an ultrasound emitter located on a first portion of an electronic apparatus.

At operation 302, in response to receiving the transmitted ultrasound wave at an ultrasound sensor located on a second portion of the electronic apparatus, the method proceeds to operation 304. Otherwise, the method exits at operation 303.

At operation 304, current propagation delay of the ultrasound wave from the ultrasound emitter to the ultrasound sensor is measured with a measurement unit of the electronic apparatus.

At operation 305, current distance between the ultrasound emitter and the ultrasound sensor is calculated with a calculation unit of the electronic apparatus based on the measured current propagation delay of the ultrasound wave from the ultrasound emitter to the ultrasound sensor.

At operation 306, current folding angle is determined by the calculation unit based on the calculated current distance between the ultrasound emitter and the ultrasound sensor and further based on configuration information about the first portion and the second portion. Here, the first portion and the second portion are arranged to be foldable with respect to each other in a folding angle.

At operation 307, a displayed graphical user interface is updated, one or more applications are launched, one or more applications are closed, and/or an operating mode is selected based on the calculated current distance between the ultrasound emitter and the ultrasound sensor.

Operation 301 may be performed e.g. by the ultrasound emitter 111 of FIGS. 1-2B. Operation 302 may be performed e.g. by the ultrasound sensor 121 of FIGS. 1-2B. Operation 304 may be performed e.g. by the measurement unit 122 of FIG. 1. Operation 305 may be performed e.g. by the calculation unit 123 of FIG. 1. Operation 306 may be performed e.g. by the calculation unit 123 of FIG. 1. Operation 307 may be performed e.g. by the processor 402 and/or integrated circuit 460 of FIG. 4.

Figure 4:
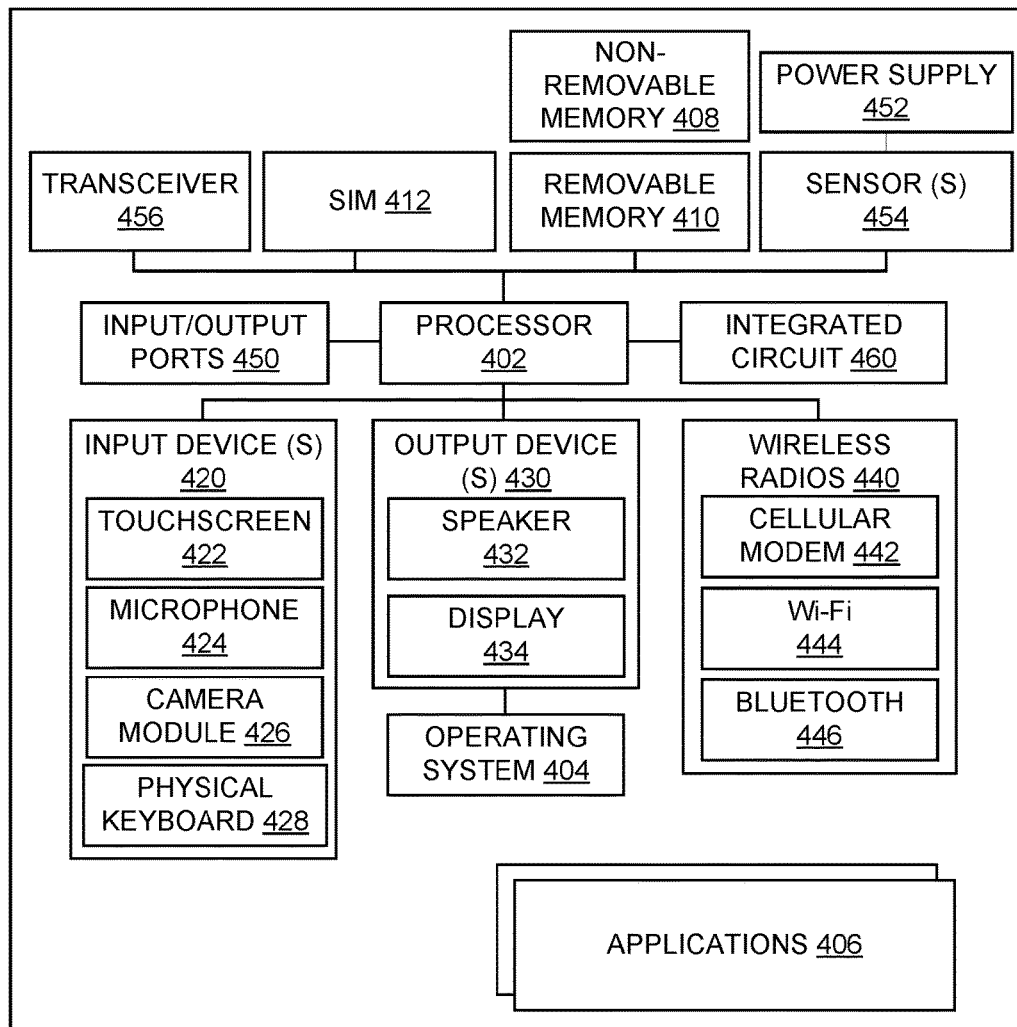
FIG. 4 illustrates an example block diagram of a device capable of implementing example embodiments described herein.

FIG. 4 is a schematic block diagram of a device 400 capable of implementing embodiments of the techniques described herein. It should be understood that the device 400 as illustrated and hereinafter described is merely illustrative of one type of apparatus or an electronic device and should not be taken to limit the scope of the embodiments. As such, it should be appreciated that at least some of the components described below in connection with the device 400 may be optional and thus in an example embodiment may include more, less or different components than those described in connection with the example embodiment of FIG. 4. As such, among other examples, the device 400 could be any of apparatuses incorporating an ultrasound emitter and an ultrasound sensor. For example, the device 400 may be implemented as a smart phone, tablet computer, laptop computer, laptop/tablet hybrid, or the like.

The illustrated electronic device 400 includes a controller or a processor 402 (i.e. a signal processor, microprocessor, ASIC, or other control and processing logic circuitry) for performing such tasks as signal coding, data processing, input/output processing, power control, and/or other functions. An operating system 404 controls the allocation and usage of the components of the electronic device 400 and support for one or more application programs 406. The application programs 406 can include common mobile applications, for instance, telephony applications, email applications, calendars, contact managers, web browsers, messaging applications, or any other application.

The illustrated electronic device 400 includes one or more memory components, for example, a non-removable memory 408 and/or removable memory 410. The non-removable memory 408 may include RAM, ROM, flash memory, a hard disk, or other well-known memory storage technologies. The removable memory 410 may include flash memory or smart cards. The one or more memory components may be used for storing data and/or code for running the operating system 404 and the applications 406. Example of data may include web pages, text, images, sound files, image data, video data, or other data sets to be sent to and/or received from one or more network servers or other devices via one or more wired or wireless networks. The electronic device 400 may further include a subscriber identity module (SIM) 412. The SIM 412 typically stores information elements related to a mobile subscriber. A SIM is well known in Global System for Mobile Communications (GSM) communication systems, Code Division Multiple Access (CDMA) systems, or with third-generation (3G) wireless communication protocols such as Universal Mobile Telecommunications System (UMTS), CDMA1000, wideband CDMA (WCDMA) and time division-synchronous CDMA (TD-SCDMA), or with fourth-generation (4G) wireless communication protocols such as LTE (Long-Term Evolution). The SIM 412 may comprise a virtual SIM. Furthermore, multiple SIMs may be utilized.

The electronic device 400 can support one or more input devices 420 and one or more output devices 430. Examples of the input devices 420 may include, but are not limited to, a touchscreen 422 (i.e., capable of capturing finger tap inputs, finger gesture inputs, multi-finger tap inputs, multi-finger gesture inputs, or keystroke inputs from a virtual keyboard or keypad), a microphone 424 (i.e., capable of capturing voice input), a camera module 426 (i.e., capable of capturing still picture images and/or video images) and a physical keyboard 428. The microphone 424 may include the ultrasound sensor 121 of FIGS. 1-2B. Examples of the output devices 430 may include, but are not limited to a speaker 432 and a display 434. The speaker 432 may include the ultrasound emitter 111 of FIGS. 1-2B. Other possible output devices (not shown) can include piezoelectric or other haptic output devices. Some devices can serve more than one input/output function. For example, the touchscreen 422 and the display 434 can be combined into a single input/output device.

In an embodiment, the electronic device 400 may comprise a wireless radio(s) 440. The wireless radio(s) 440 can support two-way communications between the processor 402 and external devices, as is well understood in the art. The wireless radio(s) 440 are shown generically and can include, for example, a cellular modem 442 for communicating at long range with the mobile communication network, a Wi-Fi radio 444 for communicating at short range with a local wireless data network or router, and/or a BLUETOOTH radio 446. The cellular modem 442 is typically configured for communication with one or more cellular networks, such as a GSM/3G/4G network for data and voice communications within a single cellular network, between cellular networks, or between the mobile device and a public switched telephone network (PSTN).

The electronic device 400 can further include one or more input/output ports 450, a power supply 452, one or more sensors 454, for example an accelerometer, a gyroscope, a compass, or an infrared proximity sensor for detecting the orientation or motion of the electronic device 400, and a transceiver 456 (for wirelessly transmitting analog or digital signals), and an integrated circuit 460. The illustrated components are not required or all-inclusive, as any of the components shown can be deleted and other components can be added.

At least parts of the measurement unit 122 of FIG. 1 and/or the calculation unit 123 of FIG. 1 may be included in the processor 402 and/or the integrated circuit 460. Alternatively/additionally, at least parts of the measurement unit 122 of FIG. 1 and/or the calculation unit 123 of FIG. 1 may be included as software in one or more of the application programs 406 and/or the operating system 404.

Computer executable instructions may be provided using any computer-readable media that is accessible by computing based devices. Computer-readable media may include, for example, computer storage media such as memory and communications media. Computer storage media, such as memory includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing based devices it will be appreciated that the storage may be distributed or located remotely and accessed via a network or other communication link, for example by using a communication interface.

At least some of the examples disclosed in FIGS. 1-4 are able to provide utilizing an ultrasound wave transmitted from an ultrasound emitter (such as a speaker) to an ultrasound sensor (such as a microphone) in order to detect a current positional configuration of an electronic apparatus having at least two parts or portions that are arranged to be movable with respect to each other. At least some of the examples disclosed in FIGS. 1-4 are able to provide determining a currents folding angle between the portions. At least some of the examples disclosed in FIGS. 1-4 are able to provide detecting the current positional configuration of the electronic apparatus without disturbing the user of the electronic apparatus due to the use of ultrasound. At least some of the examples disclosed in FIGS. 1-4 are able to provide detecting the current positional configuration with a folding angle up to 360 degrees.

An embodiment of an electronic apparatus comprises a first portion having an ultrasound emitter; a second portion having an ultrasound sensor, the first portion and the second portion arranged to be movable with respect to each other thereby allowing distance between the ultrasound emitter and the ultrasound sensor to vary; a measurement unit configured to measure current propagation delay of an ultrasound wave from the ultrasound emitter to the ultrasound sensor; and a calculation unit configured to calculate current distance between the ultrasound emitter and the ultrasound sensor based on the measured current propagation delay of the ultrasound wave from the ultrasound emitter to the ultrasound sensor.

In an embodiment, alternatively or in addition to the above described embodiments, the first portion and the second portion are arranged to be foldable with respect to each other in a folding angle.

In an embodiment, alternatively or in addition to the above described embodiments, the calculation unit is further configured to determine current folding angle based on the calculated current distance between the ultrasound emitter and the ultrasound sensor and further based on configuration information about the first portion and the second portion.

In an embodiment, alternatively or in addition to the above described embodiments, the first portion and the second portion are arranged to be slidable with respect to each other.

In an embodiment, alternatively or in addition to the above described embodiments, at least one of the first portion and the second portion is arranged to be bendable.

In an embodiment, alternatively or in addition to the above described embodiments, at least one of the first portion and the second portion is arranged to be rollable.

In an embodiment, alternatively or in addition to the above described embodiments, at least one of the first portion and the second portion comprises a display with a graphical user interface, and the electronic apparatus is configured to update the displayed graphical user interface based on the calculated current distance between the ultrasound emitter and the ultrasound sensor.

In an embodiment, alternatively or in addition to the above described embodiments, the electronic apparatus is configured to launch an application based on the calculated current distance between the ultrasound emitter and the ultrasound sensor.

In an embodiment, alternatively or in addition to the above described embodiments, the electronic apparatus is configured to close an application based on the calculated current distance between the ultrasound emitter and the ultrasound sensor.

In an embodiment, alternatively or in addition to the above described embodiments, the electronic apparatus is configured to select an operating mode based on the calculated current distance between the ultrasound emitter and the ultrasound sensor.

In an embodiment, alternatively or in addition to the above described embodiments, the ultrasound emitter comprises a speaker.

In an embodiment, alternatively or in addition to the above described embodiments, the ultrasound sensor comprises a microphone.

In an embodiment, alternatively or in addition to the above described embodiments, the first portion has at least two ultrasound emitters.

In an embodiment, alternatively or in addition to the above described embodiments, at least two of the at least two ultrasound emitters are arranged on opposite sides of the first portion.

In an embodiment, alternatively or in addition to the above described embodiments, the second portion has at least two ultrasound sensors.

In an embodiment, alternatively or in addition to the above described embodiments, at least two of the at least two ultrasound sensors are arranged on opposite sides of the second portion.

An embodiment of a method comprises transmitting an ultrasound wave with an ultrasound emitter on a first portion of an electronic apparatus; and in response to receiving the transmitted ultrasound wave at an ultrasound sensor on a second portion of the electronic apparatus: measuring, by a measurement unit of the electronic apparatus, current propagation delay of the ultrasound wave from the ultrasound emitter to the ultrasound sensor; and calculating, by a calculation unit of the electronic apparatus, current distance between the ultrasound emitter and the ultrasound sensor based on the measured current propagation delay of the ultrasound wave from the ultrasound emitter to the ultrasound sensor.

In an embodiment, alternatively or in addition to the above described embodiments, the first portion and the second portion are arranged to be foldable with respect to each other in a folding angle, and the method further comprises determining, by the calculation unit, current folding angle based on the calculated current distance between the ultrasound emitter and the ultrasound sensor and further based on configuration information about the first portion and the second portion.

In an embodiment, alternatively or in addition to the above described embodiments, the method further comprises at least one of updating a displayed graphical user interface, launching an application, closing an application, or selecting an operating mode based on the calculated current distance between the ultrasound emitter and the ultrasound sensor.

An embodiment of a foldable electronic apparatus comprises a first portion having an ultrasound emitter; a second portion having an ultrasound sensor, the first portion and the second portion arranged to be foldable with respect to each other in a folding angle thereby allowing distance between the ultrasound emitter and the ultrasound sensor to vary; a measurement unit configured to measure current propagation delay of an ultrasound wave from the ultrasound emitter to the ultrasound sensor; and a calculation unit configured to calculate current distance between the ultrasound emitter and the ultrasound sensor based on the measured current propagation delay of the ultrasound wave from the ultrasound emitter to the ultrasound sensor, and further configured to determine current folding angle based on the calculated current distance between the ultrasound emitter and the ultrasound sensor and further based on configuration information about the first portion and the second portion.

The embodiments illustrated and described herein as well as embodiments not specifically described herein but within the scope of aspects of the disclosure constitute exemplary means for detecting a current positional configuration of an electronic apparatus having at least two parts or portions that are arranged to be movable with respect to each other. For example, the elements illustrated in FIG. 1 to FIG. 2B constitute exemplary means for transmitting an ultrasound wave; exemplary means for receiving the transmitted ultrasound wave: exemplary means for measuring current propagation delay of the ultrasound wave; and exemplary means for calculating current distance between the ultrasound emitter and the ultrasound sensor based on the measured current propagation delay of the ultrasound wave from the ultrasound emitter to the ultrasound sensor.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include mobile telephones (including smart phones), tablet computers and many other devices.

The processes described herein may be performed by software in machine readable form on a tangible storage medium e.g. in the form of a computer program comprising computer program code means adapted to perform all the steps of any of the processes described herein when the program is run on a computer and where the computer program may be embodied on a computer readable medium. Examples of tangible storage media include disks, thumb drives, memory etc. and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims, and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the blocks or elements identified, but that such blocks or elements do not comprise an exclusive list, and a system, a device or an apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. An electronic apparatus, comprising:
   a first portion having an ultrasound emitter;
   a second portion having an ultrasound sensor, the first portion and the second portion arranged to be movable with respect to each other thereby allowing distance between the ultrasound emitter and the ultrasound sensor to vary, wherein the first portion and the second portion are arranged to be foldable with respect to each other in a folding angle;
   a measurement unit configured to measure current propagation delay of an ultrasound wave from the ultrasound emitter to the ultrasound sensor; and
   a calculation unit configured to:
      calculate current distance between the ultrasound emitter and the ultrasound sensor based on the measured current propagation delay of the ultrasound wave from the ultrasound emitter to the ultrasound sensor; and determine a current folding angle based on the calculated current distance between the ultrasound emitter and the ultrasound sensor and further based on configuration information about the first portion and the second portion.

2. The electronic apparatus as claimed in claim 1, wherein each of the first portion and the second portion have a graphical user interface.

3. The electronic apparatus as claimed in claim 2, wherein a display of each of the graphical user interfaces is updated based on the determined current folding angle.

4. The electronic apparatus as claimed in claim 1, wherein the first portion and the second portion are arranged to be slidable with respect to each other.

5. The electronic apparatus as claimed in claim 1, wherein at least one of the first portion and the second portion is arranged to be bendable.

6. The electronic apparatus as claimed in claim 1, wherein at least one of the first portion and the second portion is arranged to be rollable.

7. The electronic apparatus as claimed in claim 1, wherein at least one of the first portion and the second portion comprises a display with a graphical user interface, and the electronic apparatus is configured to update the displayed graphical user interface based on the calculated current distance between the ultrasound emitter and the ultrasound sensor.

8. The electronic apparatus as claimed in claim 1, wherein the electronic apparatus is configured to launch an application based on the calculated current distance between the ultrasound emitter and the ultrasound sensor.

9. The electronic apparatus as claimed in claim 1, wherein the electronic apparatus is configured to close an application based on the calculated current distance between the ultrasound emitter and the ultrasound sensor.

10. The electronic apparatus as claimed in claim 1, wherein the electronic apparatus is configured to select an operating mode based on the calculated current distance between the ultrasound emitter and the ultrasound sensor.

11. The electronic apparatus as claimed in claim 1, wherein the ultrasound emitter comprises a speaker.

12. The electronic apparatus as claimed in claim 1, wherein the ultrasound sensor comprises a microphone.

13. The electronic apparatus as claimed in claim 1, wherein the first portion has at least two ultrasound emitters.

14. The electronic apparatus as claimed in claim 13, wherein at least two of the at least two ultrasound emitters are arranged on opposite sides of the first portion.

15. The electronic apparatus as claimed in claim 1, wherein the second portion has at least two ultrasound sensors.

16. The electronic apparatus as claimed in claim 15, wherein at least two of the at least two ultrasound sensors are arranged on opposite sides of the second portion.

17. A method, comprising:
transmitting an ultrasound wave with an ultrasound emitter on a first portion of an electronic apparatus; and
in response to receiving the transmitted ultrasound wave at an ultrasound sensor on a second portion of the electronic apparatus:
measuring, by a measurement unit of the electronic apparatus, current propagation delay of the ultrasound wave from the ultrasound emitter to the ultrasound sensor;
calculating, by a calculation unit of the electronic apparatus, current distance between the ultrasound emitter and the ultrasound sensor based on the measured current propagation delay of the ultrasound wave from the ultrasound emitter to the ultrasound sensor; and
determining a current folding angle based on the calculated current distance between the ultrasound emitter and the ultrasound sensor and further based on configuration information about the first portion and the second portion.

18. The method as claimed in claim 17, wherein each of the first portion and the second portion have a graphical user interface that is updated based on the determined current folding angle.

19. The method as claimed in claim 17, further comprising at least one of updating a displayed graphical user interface, launching an application, closing an application, or selecting an operating mode based on the calculated current distance between the ultrasound emitter and the ultrasound sensor.

20. A foldable electronic apparatus, comprising:
a first portion having an ultrasound emitter;
a second portion having an ultrasound sensor, the first portion and the second portion arranged to be foldable with respect to each other in a folding angle thereby allowing distance between the ultrasound emitter and the ultrasound sensor to vary, wherein the first portion and the second portion are arranged to be foldable with respect to each other in a folding angle;
a measurement unit configured to measure current propagation delay of an ultrasound wave from the ultrasound emitter to the ultrasound sensor;
a calculation unit configured to:
calculate current distance between the ultrasound emitter and the ultrasound sensor based on the measured current propagation delay of the ultrasound wave from the ultrasound emitter to the ultrasound sensor, and further configured to determine current folding angle based on the calculated current distance between the ultrasound emitter and the ultrasound sensor and further based on configuration information about the first portion and the second portion; and
determine a current folding angle based on the calculated current distance between the ultrasound emitter and the ultrasound sensor and further based on configuration information about the first portion and the second portion.

* * * * *